Feb. 20, 1968  E. S. MURPHY  3,369,559
MODULATING VALVE
Filed Dec. 30, 1964

INVENTOR.
EUGENE S. MURPHY
BY Joseph W. Malleck
ATTY.

United States Patent Office 3,369,559
Patented Feb. 20, 1968

3,369,559
MODULATING VALVE
Eugene S. Murphy, Rockford, Ill., assignor to Borg-Warner Corporation, Chicago, Ill., a corporation of Illinois
Filed Dec. 30, 1964, Ser. No. 422,367
3 Claims. (Cl. 137—115)

ABSTRACT OF THE DISCLOSURE

A valve device having a plurality of control chambers interconnected in a cascade manner, each of the valves being of the spring biased spool type; a modulating means is employed having a fluid biased pilot against which one of these regulator springs bears to determine a regulated pressure, and another spool valve effective to control interruption of fluid bias on said pilot being operated both in on and off sequences in a delayed manner.

---

This invention relates to valve devices for controlling hydraulic fluid and more particularly to valve assemblies effective to provide a plurality of predetermined pressures, certain of said pressures being selectively regulated at different values.

In devices employing hydraulic fluid as a medium for transmitting power, there is a need for simplified hydraulic controls which will provide a minimum of fluid piping while maximizing the number of predetermined supply pressures which may be supplied to various fluid operated motors or devices, certain or all of these devices requiring at least two supply pressures to achieve varying conditions of operation without noticeable or harsh effects. A typical example of such need arises in heavy duty earth moving equipment which employs a fluid transmission having a mechanical gear means selectively changed in speed ratio by one or more fluid operated clutches and a hydrodynamic torque converter requiring a specific fluid charge pressure for proper conversion of torque. In addition, the transmission may employ a fluid operated friction device effective to interrupt the normal power transmitting capabilities of the torque converter during the transient change of speed ratios within the mechanical gear means. In most installations, the hydraulic friction device for the torque converter will require a pressurized fluid supply which must be greater in value than what can be utilized to charge the torque converter; the various clutch devices for the mechanical gear means and other elements of the transmission normally require a lubrication pressure supply which can be less in value than any of the other required pressures. Conveniently, the pressure supply of the friction device, associated with the torque converter, may be used as an engaging pressure for the hydraulic clutches of the mechanical means. Since it is important that the friction device be disengaged during the change of gears, the valve device regulating the supply pressure must be capable of selectively regulating the pressure from a relatively high pressure to a predetermined reduced pressure for this application; the change of pressure must be responsive to the manipulation of the hydraulic clutches of the mechanical or hydraulic signal means and must be modulated with respect to time to avoid abrupt reengagement and disengagement of the various devices.

Therefore, it is a primary object of this invention to provide a valve device which is effective to regulate a plurality of hydraulic fluid supplies and which is effective to selectively change the pressure of at least certain ones in a simple and economical time-phased manner.

Other objects and advantages of this invention will become apparent from the following detailed description taken in connection with the accompanying drawings, in which.

Figure 1:
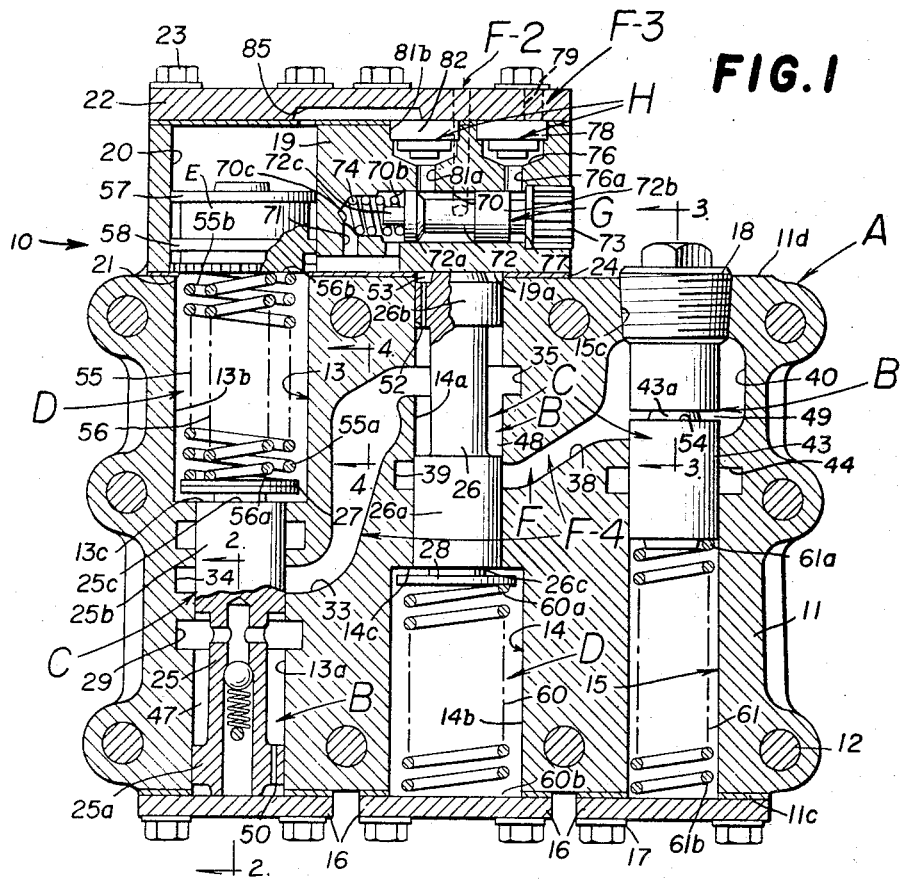
FIGURE 1 is a central sectional view of a valve device embodying the principles of this invention and illustrating the valve members therein in a first condition of operation.
Figure 2:
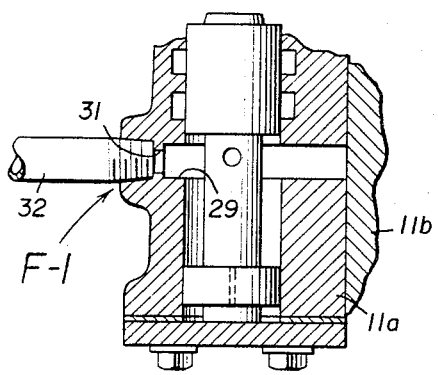
FIGURE 2 is a fragmentary sectional view taken substantially along line 2—2 of FIGURE 1.

Turning now to the drawings and more particularly to FIGURE 1, a valve mechanism or device, generally designated 10, is illustrated as a preferred embodiment hereof. The valve device broadly comprises a housing A within which are defined a plurality of control chambers B having valve members C movable therein; spring means D is interposed in said chambers for regulation of the valve members C and at least one slidable pilot E is employed to modulate the effectiveness of certain portions of the spring means D. Passage means F is provided and communicating with back side of said pilot E, and cascade passages F–4 communicating successively with each of said control chambers. A modulating means G is interposed between the second fluid inlet F–2 and the back side of said pilot E and has phased time-delay means H cooperating with a third fluid inlet F–3.

Turning now in more particularity to the components thereof, the housing A comprises a primary valve block 11 comprised of portions 11a and 11b tied together by suitable means, such as cap screws 12; block 11 has two stepped bores 13 and 14, and a bore 15 each extending transversely therethrough from opposite sides 11c and 11d. The lowermost extremities of the bores as viewed in FIGURE 1, are closed by plates 61 secured to the block 11 with gaskets 17 interposed therein between for providing a fluid seal. Terminal portion 15c of stepped bore 15 has a threaded stop 18 received therein for closing that end. Each of the stepped bores have a reduced cylindrical portion 13a and 14a respectively and each have an expanded cylindrical portion 13b and 14b respectively; the portions are separated by an annular shoulder 13c and 14c respectively.

A supplementary valve block 19 has a cylindrical bore 20 extending transversely therethrough in alignment with the expanded portion 13b of stepped bore 13; an annular shoulder 21 separates bore 20 from bore 13. Supplementary valve block 19 is attached to block 11 with a top plate 22 having a plurality of cap screws 23 extending therethrough and threadably received by block 11. Flat side 19a of the supplementary valve block is positioned against the side 11d of the primary valve block with a gasket 24 interposed therebetween; plate 22 sealably closes the open end 14c of stepped bore 14.

The movable valve members C for the step bores 13 and 14 comprise spool valves 25 and 26 respectively, each having spaced lands (25a and 25b; 26a and 26b) snugly received by the interior walls of the reduced portions 13a and 14a respectively. A central internal bore 90 is opened at one end (after a check valve 91 is overcome) to rapidly set up a differential area for fluid to bias the spool valve 25 upwardly; this fluid bias is in addition to the differential area affected by the fluid which passes through passage 50 to the end of bore 13. The respective ends 25c and 26c of the valve members carry respective head flanges 27 and 28 greater in diameter than the reduced portions of said respective bores and extending into the expanded portions 13b and 14b while spaced from the interior surface thereof.

A simple cylindrical valve member 43 is slidably disposed in the bore 15 and has a nose 43a effective to abut the stop 18 when in the uppermost position as shown in FIGURE 1; valve member 43 is snugly received within the interior wall of the bore 15.

The fluid passage means F comprises a first fluid inlet F-1, having an annular groove 29 defined in the cylindrical interior wall of the reduced portion 13a of stepped bore 13. A radial passage 31 communicates the groove 29 with the exterior of the valve block, the outer end 31a of passage 31 is threaded to receive an inlet nipple 32.

A first passage 33 of the cascade passages F-4 communicates a groove 34 formed in the interior wall of the reduced portion 13a with another groove 35 formed in the interior wall of the reduced portion 14a; grooves 34 and 29 are spaced apart an axial distance less than the spacing between said lands 25a and 25b of valve member 25. Thus the first passage 33 provides the hydraulic fluid outlet for the bore 13 and also a fluid inlet for the bore 14. An intermediate portion of the passage 33 is communicated with the exterior of the valve block 11 by a transversely extending bore 36 threaded at its outer extremity to receive a nipple 37.

Figure 3:
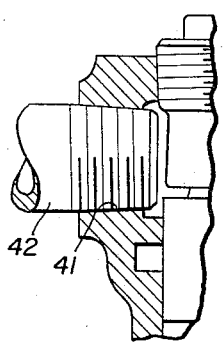
FIGURE 3 is a fragmentary sectional view taken substantially along line 3—3 of FIGURE 1.
Figure 4:
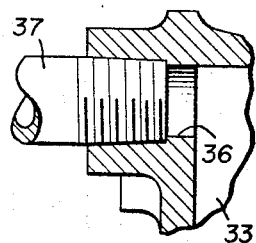
FIGURE 4 is a fragmentary sectional view taken substantially along line 4—4 of FIGURE 1.

Similarly, a passage 38 of means F-4 communicates a groove 39 of the interior wall of reduced portion 14a with a wide cylindrical recess 40 formed within the interior wall of the bore 15. Passage 38, in combination with groove 39 and recess 40, provides a fluid outlet for the bore 14 and also a fluid inlet for the bore 15. A transversely disposed bore 41 communicates the recess 40 with the exterior of the valve block 11 and is threaded at its outer extremity to receive a nipple 42 (see FIGURE 3).

Another annular groove 44 is provided in the exterior wall of bore 15 and is spaced below the recess 40 thereof; groove 44 is communicated with sump (not shown).

The control chamber 47 for bore 13 is that space defined between the lands 25a and 25b of valve member 25 and between the first fluid inlet F-1 and passage 33; the space at the remote end of bore 13 beyond land 25a is communicated with chamber 47 by a small axial passage 50. The control chamber 48 for bore 14 is defined by the space enclosed between lands 26a and 26b and between the passage 33 and passage 38; the space at the remote end of bore 14 is communicated with passage 33 by a narrow passage 52 for applying pressure against the outer surface 53 of land 26b. The control chamber 49 for bore 15 is that space subjecting fluid pressure to the surface 54 of the simple valve member 43.

The spring means D comprises a pair of concentrically nested coiled compression springs 55 and 56 each having one end 55a and 56a respectively engaged with the head flange 27 of the valve member 25. The opposite ends 55b and 56b respectively are engaged with the cylindrical pilot E slidably disposed in the bore 20 of the supplementary valve block 19; the pilot has annular ridges 57 and 58 snugly received by the interior wall of the bore 20. As shown in FIGURE 1, the pilot E is in a first position effective to provide a predetermined reaction for the coil springs 55 and 56 and maintain a relatively high predetermined force against the valve member 25 and thereby control a relatively high predetermined fluid pressure in the first inlet means F-1.

Spring means D also comprises a single coil compression spring 60 disposed in the expanded portion 14b of bore 14, having one end 60a engaged with the head flange 28 of valve 26 and an opposite end 60b engaged with one of the plates 16 closing the open extremity of bore 14.

Spring means D further comprises a coil compression spring 61 disposed in the cylindrical bore 15 having one end 61a engaged with the bottom face of the valve member 43 and another end 61b engaged with one of the closure plates 16 covering the exposed portion of the bore 15. Said springs 60 and 61 having a predetermined spring rate effective to maintain a force upon said respective valve members 26 and 43 for maintaining specific fluid pressures in said control chambers 48 and 49.

The modulating means G is comprised of elements which are substantially enclosed within this supplementary block 19 with pilot E comprising a part thereof. A stepped bore 70 is defined in the block 19 extending in a direction generally transverse to the elongated extent of bores 13–15. The reduced portion 70a of bore 70 is in communication with the front face of pilot E by passages 71. The spool valve 72 is slidably disposed within the expanded portion 70b of bore 70 and carries lands 72a and 72b. The outer extremity of bore 70 is closed by a closure member 73, as shown in FIGURE 1. Spring 74 is disposed between the end 72c of the valve member and end 70c of bore 70; spring 74 is effective to normally urge the valve member to the right so that the head flange 72b engages the closure member 73.

The third inlet F-3, comprises a stepped passage 76 having a reduced portion 76a communicating with bore 70 at a position whereby fluid may be conveyed to the surface 77 of the valve member. The expanded portion of the passage 76 is effective to carry a phased valve means 78. Preferably phased valve means 78 is provided in the form of an orifice check valve oriented so as to become unseated for permitting rapid fluid flow from inlet F-3 to spool valve 72 responsive to a pressure rise in inlet F-3, while providing for restricted fluid flow in the reverse direction through the orifice from spool valve 72 toward inlet F-3 responsive to a pressure drop in inlet F-3. Suitable valves for this purpose have been sold by the AC Spark Plug Division of General Motors Corporation designated as Part No. 5,573,861. A port 79 extends through the cover plate of the supplementary block and is effective to receive a threaded nipple (not shown).

The second inlet means F-2 comprises a passage communicating with bore 70 at a position whereby land 72b may open or close the passage F-2 depending upon the position of valve member 72. The expanded portion 81b of the passage carries a time-phases valve means 82, time phased valve means 82 is also an orifice type check valve similar to phase valve member means 78. An opening is provided through the supplementary block cover plate 22 communicating with the passage 81 and carries a threaded nipple (not shown). A groove 85 is formed in the under side of the supplementary valve block plate effective to communicate the passage 81 with the back side of the pilot E.

In operation fluid is normally supplied to a fluid inlet F-1 where its pressure in chamber 47 may exert a differential force upward (as viewed in FIGURE 1) against spool valve 25 due to the difference in surface area affected by the inlet pressure; internal bore 90 is quickly opened at one end thereof to set up the first area differential and secondly, fluid passes through passage 50 to the extremity of bore 13 to act against the lower-most of land 25a. The degree to which land 25b uncovers passage 33 is determined by the preset spring assembly 55 and 56 which hold the spool valve in a normally depressed position. The degree of uncovering passage 33 regulates the fluid pressure which is communicated to first fluid outlet 36 (useful, for example, for operating a high pressure device such as a brake).

Sequence valve regulators are connected in a cascade manner to the first valve. Fluid is cascaded to a second valve chamber 48 and operates to urge the spool valve 26 downwardly against the preset spring 60; since a differential fluid force is created by fluid passing through passage 52 to extremity of bore 14 (similar in fashion for the first valve), the valve is urged to counter to spring 60 and will tend to uncover the passage 38 in a degree dependent upon its inlet pressure. A second outlet leading from passage 38 may be useful for filling an intermediate pressure device, such as a torque converter.

Similarly, the third valve 43 is also spring biased in an upward position and fluid received from passage 38 will attempt to counter such spring and uncover the outlet passage 44 as determined by the force differential where fluid may pass through a small passage to the extremity of the bore 40.

At least one of these regulator valves may be modulated in response to an independent pressure signal to dump the entire chamber pressure without regulation. This is accomplished by a pilot E against which the spring bias for the valve must bear; the pilot is fluid biased on its opposite side and communication on this fluid bias is controlled by an independent spool valve G which is moved to an opened or closed position by said independent pressure signal.

Fluid pressure passage F-2 is communicated from the mid portion of valve 72 through the passage 81, 81a and orifice check valve 82 to the cavity 20 through the passage 85. Increased pressure in passage F-3 is communicated to the surface 77 of valve member 72 through the passage 76, 76a and orifice check valve 78. This rise in fluid pressure is effective to quickly move the valve 72 to the left as viewed in FIGURE 1, such that land 72b seals the passage F-2 and establishes communication between passage 81a and sump which is in communication with the passage 71. When valve 72 is in the extreme left hand position, fluid from the cavity 20 passes through the passage 85 unseating check valve 82 permitting rapid travel of the spool member E. The pressure fluid introduced into F-2, F-3 and exhausted selectively may be under the control of the usual hand control valve, having a succession of controlled ports depending upon the manually selected position thereof.

While I have described my invention in connection with one specific embodiment and other alternative suggestions thereof, it is understood that this is by way of illustration and not by way of limitation and the scope of my invention is defined solely by the appended claims which should be construed as broadly as the prior art will permit.

I claim:

1. A hydraulic valve device, comprising: a housing having means defining one or more hydraulic fluid control chambers, a receptacle associated with each of said control chambers and each having stop means; means defining a first hydraulic fluid inlet to said first control chamber, means defining passages serving as the hydraulic fluid outlet from said first control chamber and successively communicating with the other of said control chambers in cascade manner; means defining valve members movable in each of said controls chambers effective to control communication of the hydraulic fluid between the fluid inlets and fluid outlets to each of said respective chambers; spring means normally biasing each of said valve members to one position of communication, said valve members each having a surface subject to hydraulic fluid from the associated inlet for biasing said valve member against the associated spring means; a pilot slidably disposed in the receptacle associated with said first control chamber and having a front side against which said spring means therein reacts to regulate the valve member; means defining a second fluid inlet having a passage communicating with the back side of said slidable pilot whereby a selectively controlled hydraulic back pressure may be maintained against said pilot which in turn regulates the effectiveness of the associated spring; and supplementary control means effective to regulate the communication of said second fluid inlet with the back side of said pilot whereby at least two conditions of said pilot may be achieved.

2. A valve device as in claim 1, in which said supplementary control means comprises a supplementary chamber interposed in said passage between said second fluid inlet and said pilot back side; a supplementary valve member slidable within said supplementary chamber; spring means normally biasing said supplementary valve member to a first position in which full communication is maintained between said second fluid inlet and said pilot back side, third fluid inlet means communicating with said supplementary valve member to selectively overcome said spring means and move said valve member to a second position in which fluid communication is prevented between said second fluid inlet and said pilot back side, and including pressure responsive means for time-phasing of change of communication between said second fluid inlet and said pilot back side as well as the communication between said third inlet and said supplementary valve member.

3. A hydraulic valve device comprising: a first valve block having a plurality of parallel and spaced stepped bores extending therethrough and between opposite sides thereof; fluid passage means defining a first fluid inlet to the reduced portion of the first of said stepped bores and defining cascade fluid passages successively communicating the reduced portions of each of said stepped bores, said cascade fluid passages serving as the fluid outlet from one stepped portion and the fluid inlet to the next of said communicated portions; a valve member slidable in each of said reduced portions having at least one surface subject to the associated inlet fluid pressure; spring means in each of said expanded portions of said stepped bores having one portion bearing against said valve member for normally urging said valve member to a first condition communicating said inlet and outlet means thereof, a slidable pilot disposed in at least one of said expanded portions effective to provide a reaction for said spring means to influence the associated valve member, plate means effective to close the open ends of said stepped bores in said valve block while leaving exposed one end of the bore associated with the slidable pilot; a supplementary valve block secured to one side of said first valve block and having a supplementary control chamber communicating with the back side of said pilot; second fluid inlet means communicating with said supplementary control chamber; and modulating means effective to selectively interrupt the communication between second fluid inlet means and said supplementary control chamber and having delay means for time-phasing the operation of said modulating means, said delay means having at least one pressure responsive phased valve provided with a restricted orifice whereby fluid flows only through said restricted orifice until fluid pressure is sufficient to unseat said phased valve for promoting a more rapid flow of fluid.

References Cited
UNITED STATES PATENTS
2,668,552  2/1954  Hobbs _____ 137—115

STANLEY N. GILREATH, *Primary Examiner.*